US 6,739,087 B2

(12) United States Patent
Weiser et al.

(10) Patent No.: US 6,739,087 B2
(45) Date of Patent: May 25, 2004

(54) GARDEN PEST TRAP

(75) Inventors: Isaac Weiser, Tarzana, CA (US); Margaret Weiser, Tarzana, CA (US)

(73) Assignee: Exhart Environmental Systems, Inc., Chatsworth, CA (US)

( * ) Notice: Subject to any disclaimer, the term of this patent is extended or adjusted under 35 U.S.C. 154(b) by 0 days.

(21) Appl. No.: 10/272,664

(22) Filed: Oct. 15, 2002

(65) Prior Publication Data

US 2004/0068918 A1 Apr. 15, 2004

(51) Int. Cl.[7] ................................................ A01M 1/20
(52) U.S. Cl. ........................................... 43/121; 43/131
(58) Field of Search ........................ 43/107, 121, 122, 43/131, 132.1; D22/122

(56) References Cited

U.S. PATENT DOCUMENTS

| | | | |
|---|---|---|---|
| 2,167,978 A | * 8/1939 | Jennerich | 43/121 |
| D128,787 S | 8/1941 | Nelson | |
| 3,550,308 A | * 12/1970 | Ibach | 43/121 |
| D227,563 S | 7/1973 | Torchia | D22/6 |
| 3,772,820 A | 11/1973 | Bond | 43/131 |
| 3,978,607 A | 9/1976 | Piere | 43/131 |
| 4,251,946 A | 2/1981 | Lindley | 43/131 |
| 4,328,637 A | 5/1982 | Eichmuller et al. | 43/121 |
| 4,747,230 A | 5/1988 | Zalesky | 43/121 |
| 4,761,912 A | 8/1988 | Dyer et al. | 43/121 |
| D326,702 S | 6/1992 | Demarest | D22/119 |
| 5,119,586 A | * 6/1992 | Townsend | 43/114 |
| D328,486 S | 8/1992 | Sase | D22/119 |
| D329,681 S | 9/1992 | Demarest et al. | D22/122 |
| 5,175,958 A | 1/1993 | Wedemeyer | 43/121 |
| D347,675 S | * 6/1994 | Demarest et al. | D22/119 |
| 5,505,018 A | * 4/1996 | Parker | 43/124 |
| 5,548,922 A | * 8/1996 | Wefler | 43/131 |
| D374,904 S | 10/1996 | Miller | D22/119 |
| 5,622,001 A | 4/1997 | Kazmierzak | 43/121 |
| 5,943,816 A | * 8/1999 | Hyatt et al. | 43/131 |
| 5,960,585 A | * 10/1999 | Demarest et al. | 43/131 |
| 6,145,242 A | 11/2000 | Simpson | 43/131 |
| 6,216,383 B1 | 4/2001 | Klabunde et al. | 43/121 |
| 6,272,791 B1 | * 8/2001 | Pleasants | 43/131 |
| 6,370,813 B1 | * 4/2002 | Nelson et al. | 43/131 |

FOREIGN PATENT DOCUMENTS

| | | | |
|---|---|---|---|
| AT | 49265 | * | 8/1911 |
| DE | 3429002 | * | 2/1986 |
| DE | 19827346 | * | 12/1999 |
| EP | 0388349 | * | 9/1990 |
| EP | 1 002 462 A2 | | 5/2000 |
| GB | 2302005 | * | 1/1997 |
| GB | 2346536 | * | 8/2000 |
| JP | 9-98703 | * | 4/1997 |
| WO | WO 00/60938 | | 10/2000 |

* cited by examiner

*Primary Examiner*—Peter M. Poon
*Assistant Examiner*—David Parsley
(74) *Attorney, Agent, or Firm*—Cislo & Thomas LLC

(57) ABSTRACT

A pest trap for trapping snails, slugs, and the like comprising a base structure and a decorative cover. The base structure comprises a planar surface, a sloping surface surrounding at least part of the planar surface, two or more recesses formed in the planar surface for retaining a liquid for luring the pests, and a containment surface that is inclined and surrounds each recess. The cover rests over the base structure, preferably mounted on one or more side walls that partially enclose the planar surface and optionally have flanged ends for partially enclosing the recesses. Use and maintenance of the trap of the present invention is thereby greatly simplified and may be environmentally friendly utilizing common beer or other non-liquid luring means.

21 Claims, 5 Drawing Sheets

GARDEN PEST TRAP

BACKGROUND OF THE INVENTION

1. Field of the Invention

This invention relates to traps for pests, and in particular, to traps for garden pests such as snails, slugs, and the like.

2. Description of the Related Art

Snails, slugs, and related garden pests are destructive to garden, nuisances, and difficult to control. The inventors are unaware of any simple, nontoxic, environmentally friendly and inexpensive means for effectively removing snails, slugs and other such pests from a garden or yard environment. Certain commercially available pesticides are unacceptable in many situations for a multitude of reasons. As a result, traps have become a staple of the gardener's defense against these garden pests. Historically, there have been developed a number of trap devices for trapping garden pests.

Some traps, however, require elaborate preparations, including first digging a trench or hole large enough to receive a substantial portion of the trap. Many traps require costly and messy maintenance. Many utilize poisons or cause sticky remains, making clean up and disposal difficult and time consuming. The toxins often require specialized disposal and may nevertheless spread to the surrounding yard, garden or crops.

What was needed was a trap that was effective, yet simple to use, maintain, and reuse. The result was the present invention which is as well environmentally friendly and inexpensive to use.

SUMMARY OF THE INVENTION

The present invention is a pest trap comprising a base structure and a decorative cover. The base structure comprises a planar surface, a sloping surface surrounding at least part of the planar surface, two or more recesses formed in the planar surface for retaining a liquid for luring the pests, and a containment inclining surface surrounding each recess.

The pest trap may also optionally have one or more side walls partially enclosing the planar surface and each of the two or more of the recesses. The side walls may be designed with flanged ends to provide greater enclosure of the recesses in order to make it more difficult for the pests to leave after entering.

The recesses may be either internal recesses or side recesses, or both. The side recesses can also beneficially be partially contained within a side wall and its end flanges. The base structure may be designed to have a low profile while still achieving the desired goal of luring and trapping garden pests, with an overall height, of less than two inches. In this embodiment of the present invention, the use of the trap greatly simplified, reducing the need to dig a hole in the ground for sinking a portion of the trap as in several prior art traps.

The invention may also be compatible for use with a non-toxic and ecologically friendly liquid for luring pests into the recesses. The result of such an embodiment of the present invention is that the filling, maintenance, pest removal, clean up, and refilling is all substantially simplified for the user over certain prior art pest traps that require toxins or other non-liquid luring means.

DESCRIPTION OF THE PREFERRED EMBODIMENT(S)

The detailed description set forth below in connection with the appended drawings is intended as a description of presently-preferred embodiments of the invention and is not intended to represent the only forms in which the present invention may be constructed and/or utilized. The description sets forth the functions and the sequence of steps for constructing and operating the invention in connection with the illustrated embodiments. However, it is to be understood that the same or equivalent functions and sequences may be accomplished by different embodiments that are also intended to be encompassed within the spirit and scope of the invention.

Figure 1:
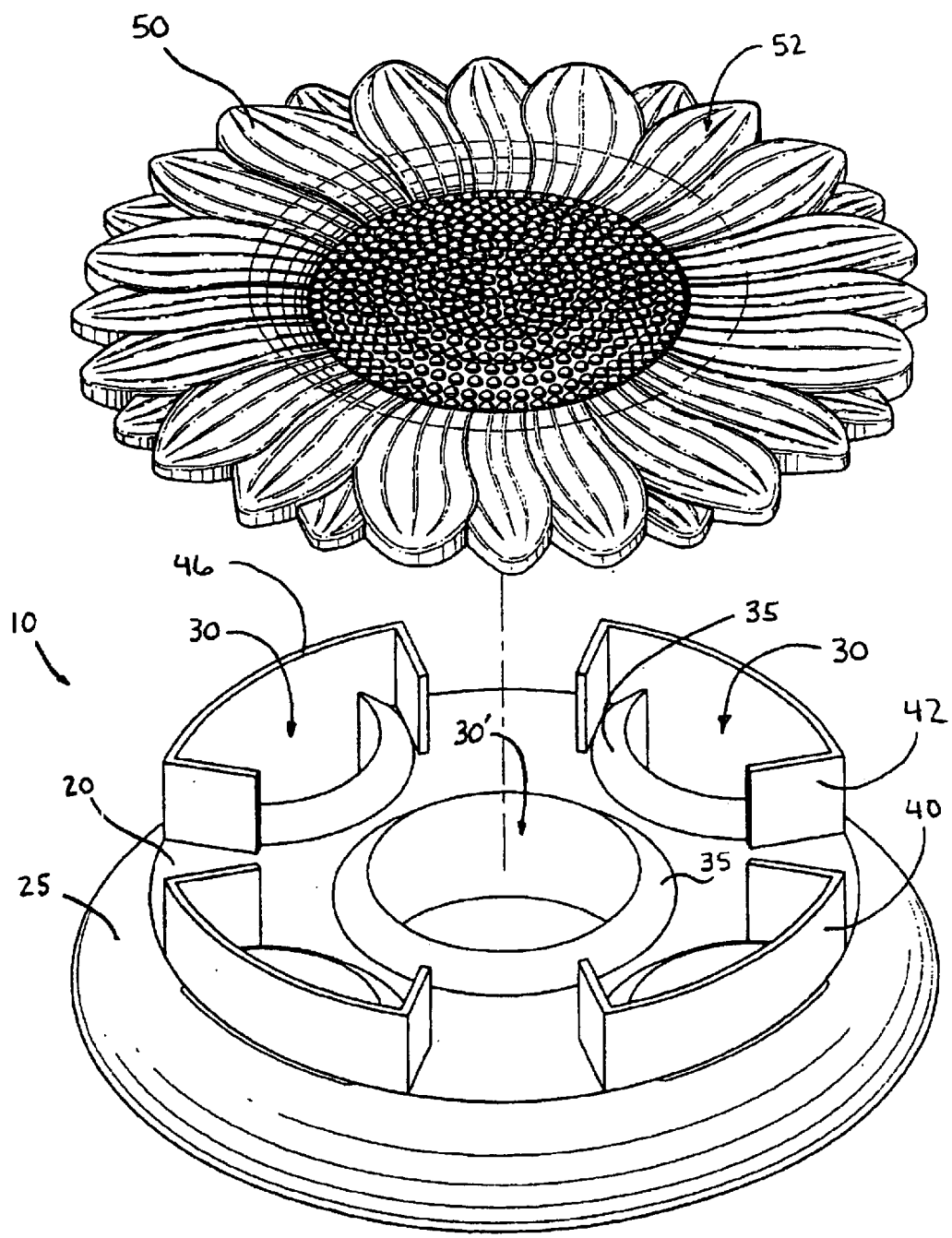
FIG. 1 is an exploded perspective view of one embodiment of the present invention.

One preferred embodiment of the present invention is shown in FIG. 1, which illustrates a pest trap that comprises a base structure 10 and a decorative cover 50. The base structure 10 is preferably formed of plastic and molded to the shaped described below. Base structure 10 of the particular embodiment shown in. FIG. 1 comprises a planar surface 20 and a sloping surface 25 surrounding at least part of the planar surface, 20. The sloping surface 25 is designed to meet with the ground at its lower edge and rise to the planar surface 20.

Figure 3:
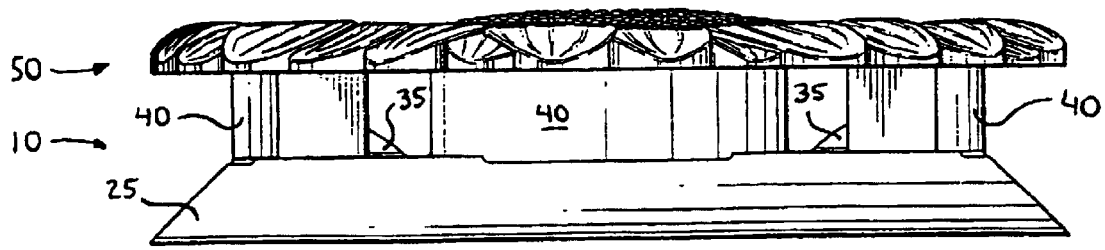
FIG. 3 is a side elevation view of the embodiment shown in FIG. 1.
Figure 4:
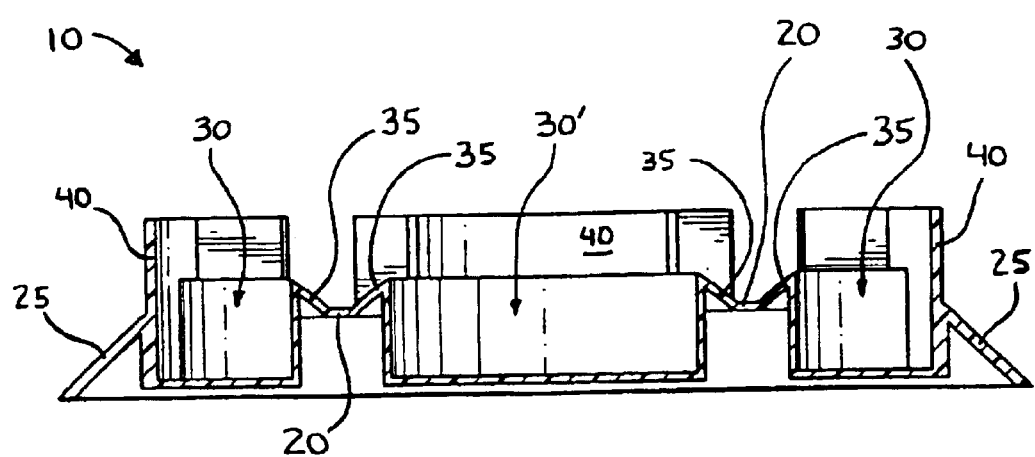
FIG. 4 is a cross-sectional view of the embodiment of FIG. 2 as taken from line IV—IV therein.

The angle of sloping surface 25 is shown in FIGS. 1 and 3 to be approximately 40°, but the present invention equally contemplates a sloping surface having essentially any angle of incline, provided that the purposes of the trap are maintained. That is, the angle should not be so great that an average snail or slug would be inhibited thereby from venturing up into the trap. On the other hand, the angle of the incline of the sloping surface 25 should not be so small that the overall footprint of the trap would become unduly burdensome to manufacture, stock, ship, sell, use, and if desired, hide away in a discrete location in a garden, backyard, or the like.

Additionally, in certain applications, this lower limit for the angle of incline is also limited by a concern with inadvertent flooding of the trap by outside sources of water. Also, the embodiment shown in FIG. 1 is designed to reside entirely above ground, and not require the user to dig a hole for sinking a portion of the trap. Thus, with such embodiments, the angle of incline must be sufficient to provide enough vertical clearance for the recesses 30, which are discussed further below, to reside substantially above the ground. Based on these factors, it is generally preferred that the angle of incline of the present invention is between approximately 10° and 75°, and more particularly preferably between 25° and 50°.

Base structure 10 of the embodiment shown in FIG. 1 also comprises two or more recesses 30 formed in the planar surface 20 for retaining a liquid for luring the pests.

Recesses 30 may be of essentially any dimension, although they should be large enough to retain a snail, slug, or other pest of concern. They should also be large enough to retain sufficient amounts of luring liquid to intoxicate and then drown the garden pests, as well as withstand evaporation over a period of time. On the other hand, there is no real limit on the maximum size of recesses 30 other than, perhaps, that they need not be so large as to create an undue obstruction in the garden or backyard environment such that they might interfere with the user's enjoyment of the garden, backyard, or the like. Depending on their location upon the planar surface 20, one of more of the recesses 30 may be substantially semi-circular in configuration.

Figure 5:
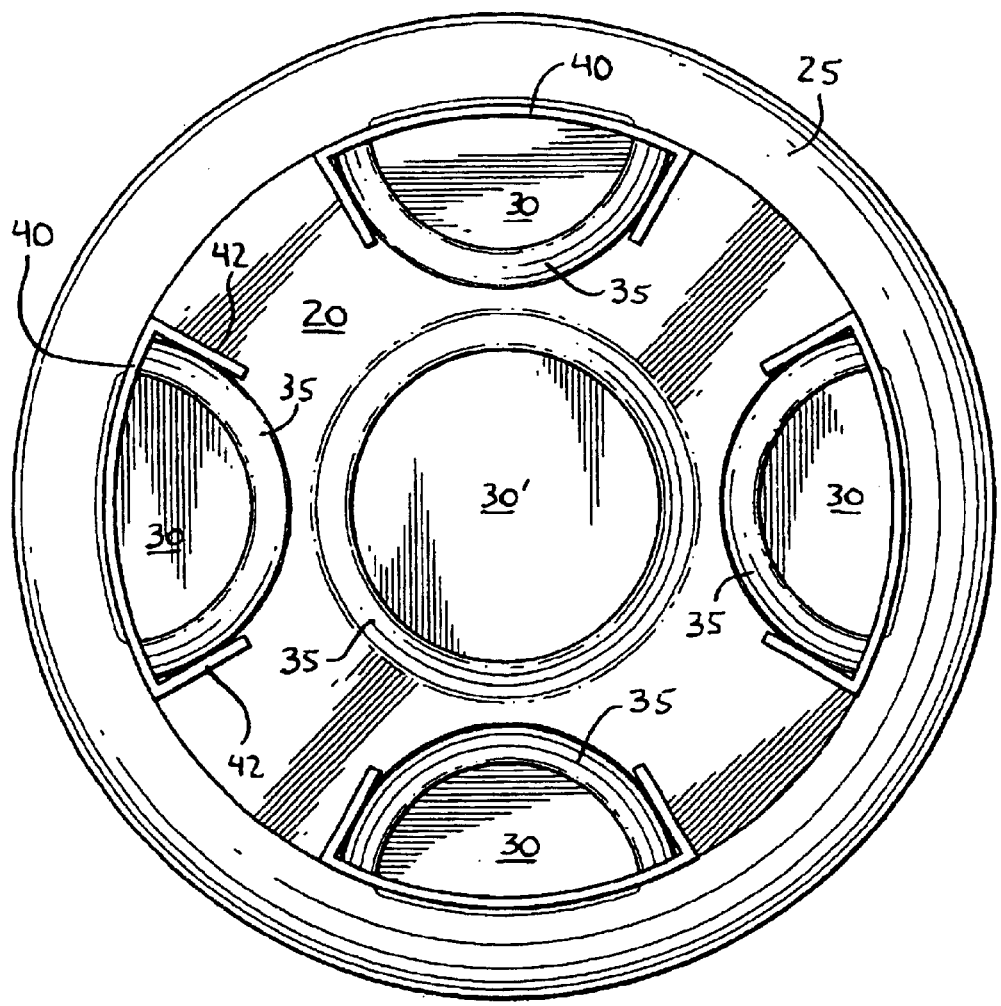
FIG. 5 is a top plan view of a base structure 10 of one embodiment of the present invention.

Each of the recesses 30 are surrounded by a containment surface 35, or at least the ingress and egress portions of each recess 30 are surrounded by containment surface 35. Each containment surface 35 is inclined relative to the planar surface 20. Containment surfaces 35 provide an additional hurdle for the pests in entering or attempting to exit the recesses 30. The angle of incline of the containment surfaces of the embodiment shown in FIG. 3 and 5 is approximately 40°, but any number of other angles are equally contemplated within the scope and purposes of the present invention. The incline could be small, provided that the pests find it difficult to escape recesses 30 and that recesses 30 are not easily flooded by water from outside sources. On the other hand, the angle could be quite large provided that the pests are not unduly inhibited from venturing into recesses 30.

Figure 6:
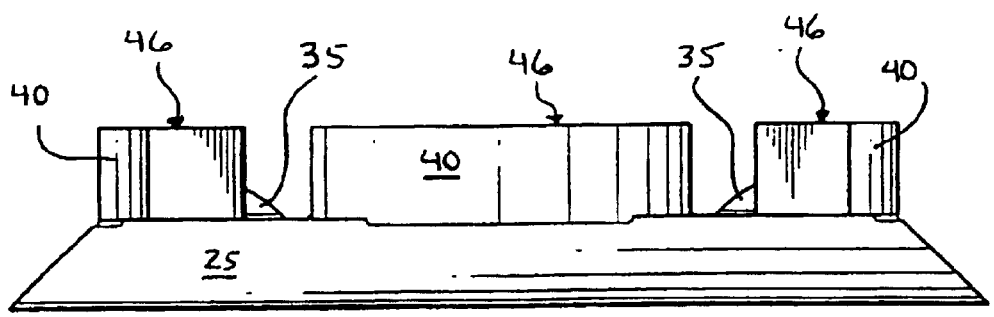
FIG. 6 is a side elevation view of the example base structure 10 shown in FIG. 5.
Figure 7:
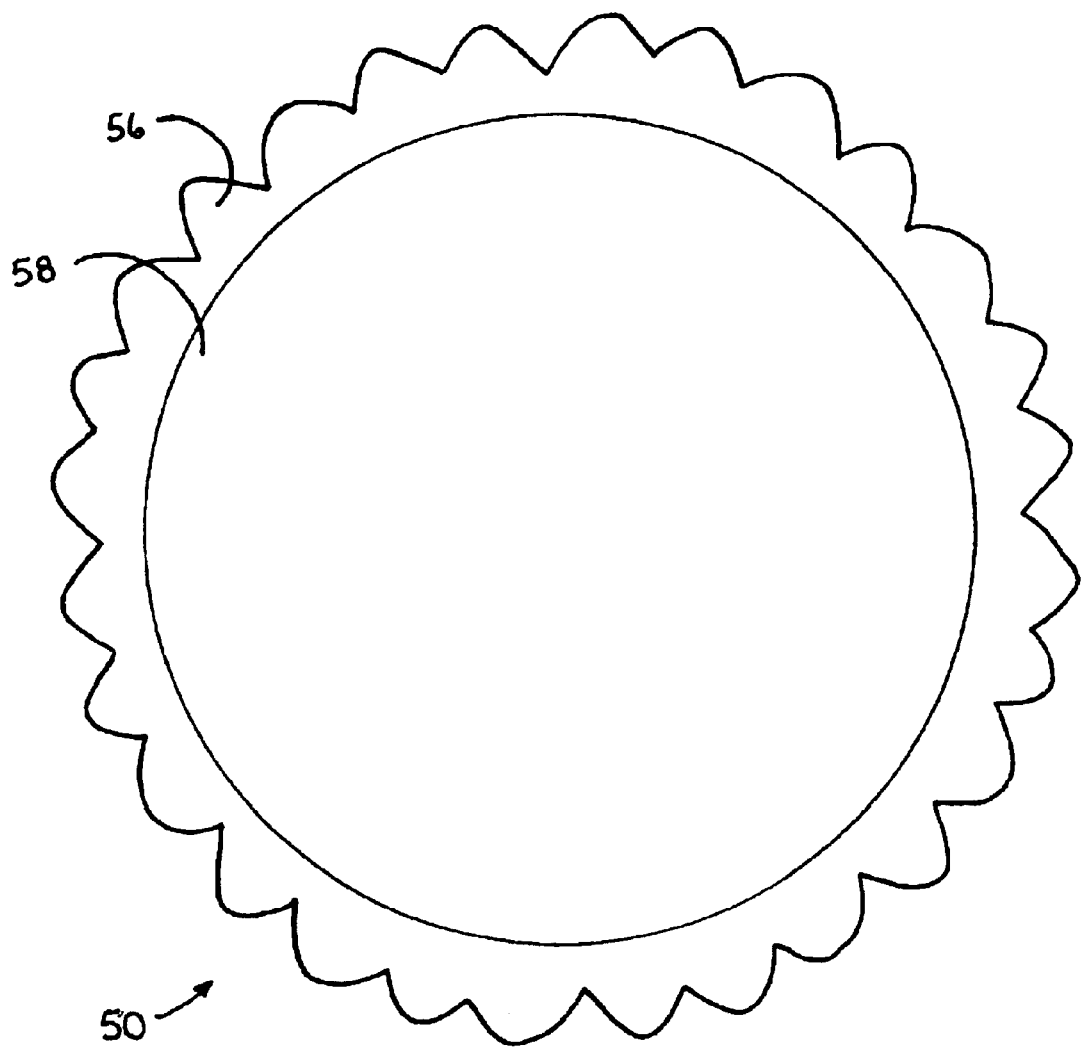
FIG. 7 is a bottom view of a lid for one embodiment of the present invention.

FIGS. 1 and 6 show an embodiment that also has one or more side walls 40. The side walls 40 function to provide a sufficient clearance above the planar surface 20 for the pests to have the room necessary to enter the pest trap. The side walls 40 also may provide sufficient obstruction to light such that the trap achieves the a added lure of providing a dark place for the pests to reside. Where there are more than one side wall 40, the side walls collectively function to define the outer surface of the trap. Thus, in the embodiment shown in FIG. 1, the side walls 40 partially enclose the planar surface 20 and each of the two or more of the recesses 30.

Between the ends of side walls 40 are the entrances to the trap. The upper surfaces of the side walls 40 provide a mounting surface for a cover 50. Cover 50 has a top surface 52 and a bottom surface 56. The top surface 52 may be functional, such as providing a deterrence to birds or the like, in addition to any other such structures in the garden. Alternatively, top surface 52 may be of any aesthetically pleasing shape or design, such as might be adequately pleasing to the eye of the garden owner. The top surface illustrated in FIG. 1 is that of a sunflower, but any number of other aesthetic or functional designs are equally encompasses within the scope and meaning of the present invention.

The bottom surface 56 of cover 50 may have a simple annular recess 58 dimensioned to lie on top of the side walls 40. The outer edge of the recess 58 and the weight of the cover 10 is ordinarily sufficient to resist accidental removal by wind, rain, small animal, or the pests for which the trap is designed. Alternatively, the bottom surface 56 and the side walls 40 may just as effectively contain other fastening features, such as screw threads on the side walls and a tapped inner surface on the cover bottom 56 so that the cover screws down like a lid of a jar, or the bottom surface 56 could be designed to snap fit over the side walls 40. In any event, the cover 50 is not likely to be accidentally removed, but may otherwise be easily removed by the owner when overseeing any progress of the trap.

With respect to the embodiment of FIGS. 1 and 6, the ends of side walls 40 of FIG. 1 are equipped with flanged ends 42. Flanged ends 42 wrap around recesses 30 to provide more thorough enclosure of the recesses 30 in order to make it more difficult for the pests to escape after entering, as well as in order to make recesses 30 particularly dark and inviting to the pests. The flanged ends 42 should not be, however, so enclosing of recesses 30 that the pests never find recesses 30. Thus, there is a balancing between the length of each flanged end 42 and the ability of the trap to attract pests into the recesses 30. The flanged ends 42 shown in FIG. 1 appear to be the same height as side walls 40, but they could be of any height and length so long as they continue to provide an effective partial enclosure of recesses 30.

Figure 2:
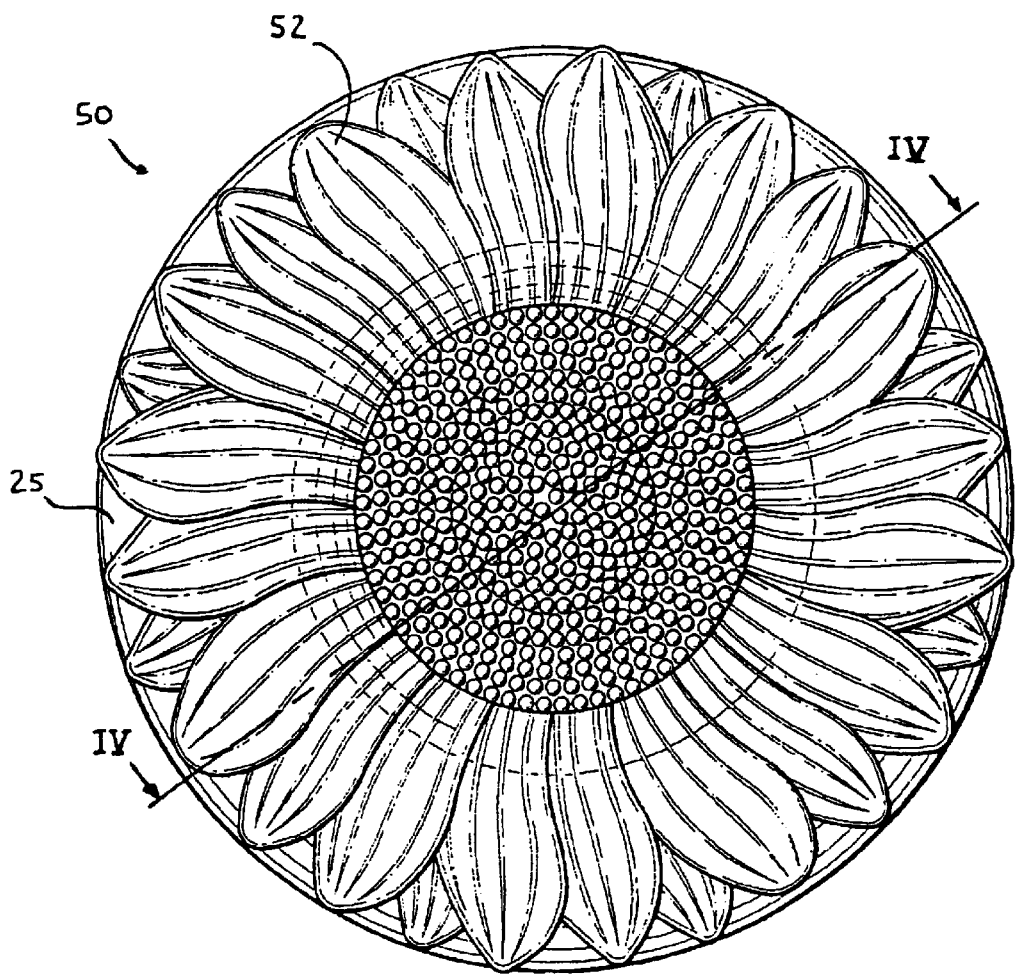
FIG. 2 is a top plan view of the embodiment shown in FIG. 1.

Recesses 30 may be either side recesses 30 or internal recesses 36, or both, as shown in FIG. 1. That is, they may either reside at the edge of planar surface 20 or well within these edges closer to the middle of planar surface 20. Each of the side recesses shown in FIGS. 1, 2, and 6 is partially contained within a side wall 40 and its two end flanges 42, whereas the internal recess is not immediately surrounded by a side wall.

Base structure 10 may also be designed to have a low profile, as shown in FIG. 1, while still achieving the desired goal of luring and trapping garden pests. The embodiment shown in FIG. 1 achieves these goals with an overall height of about one to three inches with about 2 inches being adequate. In this embodiment of the present invention, the use of the trap greatly simplified, reducing or even avoiding the need for the user to dig a hole in the ground for sinking a portion of the trap as is required by several prior art traps.

The invention may also be compatible for use with a non-toxic and ecologically friendly liquid for luring pests into the recesses, such as common beer or other yeast and sugar containing liquid. As a result, the present invention greatly simplifies the filling, maintenance, pest removal, clean up, and refilling of the trap when compared to certain prior art pest traps that require toxins or other non-liquid luring means.

In operation, a garden owner places the base structure 10 down on the ground in a secluded place in a garden or the like, or at some location where the unwanted garden pests have been observed. The garden owner pours into each of the preformed recesses 30 a small amount of beer or other liquid for luring the pests, such a water containing a small amount of sugar and yeast. The decorative cover 50 is then placed atop the base structure 10, allowing an annular recess 58 on the bottom surface 56 of the cover 50 to catch on the upper surfaces 46 of side walls 40 sufficiently so that cover 50 does not mistakenly slide off the base structure 10.

The garden owner then may go about his or her day or week, occasionally checking the contents of the trap by removing the cover 50. Any caught pests are easily visible once the cover is removed. If no pests have been caught, or if only one or a few have been caught, then the owner may simply replace the cover 50. If there are a sufficient amount of pests caught in the trap, the owner can simply invert the trap over a garbage can, rinse the remaining beer and debris off of the trap, and repeat to foregoing steps, refilling the recesses 30 with more beer or other luring liquid. This process is much simpler, much more sanitary, and much more environmentally friendly than what is required of a number of prior art traps, as has been described above.

While the present invention has been described with regards to particular embodiments, it is recognized that additional variations of the present invention may be devised without departing from the inventive concept.

What is claimed is:

1. A pest trap comprising:

a cover; and, a base structure comprising a planar surface, a downward sloping surface surrounding and elevating said planar surface, at least one internal recess centrally formed in said planar surface and at least one substantially semi-circular side recess formed adjacent thereto at a periphery of said planar surface for containing a liquid for luring pests, an inclined sloping surface defining a retaining wall surrounding at least one of said internal and side recesses, and a plurality of side walls extending upward directly from said planar surface for supporting said cover above and spaced from said planar surface, said side walls being spaced and separated one from the other to partially enclose said planar surface and thereby define an entry space therebetween, at least one said side wall being joined to at least partially surround and laterally enclose said side recess.

2. A pest trap as in claim 1 wherein each of said side walls partially encloses one or more of said side recesses.

3. A pest trap as in claim 2 wherein each of said side walls further comprises flanged ends to provide greater enclosure of said recesses.

4. A pest trap as in claim 3 wherein each of said side recesses is partially contained within a side wall and its end flanges.

5. A pest trap as in claim 1 wherein said base structure is at least two inches in height.

6. A pest trap as in claim 1 wherein said pest trap is compatible for use with a non-toxic and ecologically friendly liquid for luring pests into said recesses.

7. A pest trap as in claim 1 wherein said cover has a decorative top surface for purposes of placement in a garden, yard, or other location view able by others.

8. The pest trap as in claim 1 wherein said internal and side recess comprise a combination of circular and semi-circular recesses.

9. A method for trapping garden pests comprising the steps of:

setting a base structure on the ground in a garden or other yard environment, said base structure comprising an elevated planar surface, at least one internal recess centrally formed in said planar surface and at least one substantially semi-circular side recess formed adjacent thereto at a periphery of said planar surface sufficient to retain liquid to lure and drown said garden pests, a downward sloping surface descending from said planar surface and surrounding said planar surface, inclined containment surfaces surrounding each of said recesses and sloped in the direction of the recess to permit pests to enter said recess but prohibit pests from exiting said recess, and a plurality of side walls extending upward directly from said planar surface for supporting a cover above and spaced from said planar surface, said side walls being spaced and separated one from the other to partially enclose said planar surface and thereby define an entry space there between, at least one said side wall being joined to at least partially surround and laterally enclose said side recess;

pouring into one or more of said recesses a luring liquid, covering said base structure with a cover, emptying out said recesses if sufficient numbers of pests have been caught, and refilling said recesses with said luring liquid.

10. A method of trapping as in claim 9 wherein each of said side walls partially encloses one or more of said side recesses for creating a dark environment to better lure said pests.

11. A method of trapping as in claim 10 wherein each of said side walls further comprises flanged ends for providing greater enclosure of said recesses.

12. A method of trapping as in claim 11 wherein each of said side recesses is partially contained within a side wall and its end flanges.

13. A method of trapping as in claim 9 wherein said base structure is less than two inches in height so that the user does not need to first dig a trench or hole.

14. A method of trapping as in claim 9 wherein said pest trap is compatible for use with a non-toxic and ecologically friendly liquid for luring pests into said recesses for ease of use and maintenance.

15. A method of trapping as in claim 9 wherein said cover has a decorative top surface for purposes of placement in a garden, yard, or other location view able by others to improve aesthetics during use.

16. The method of claim 9 wherein said sloping surface descending from said planar surface surrounds all of said planar surface.

17. The method of claim 9 wherein said two or more recesses comprises a combination of circular and semi-circular recesses.

18. The method of claim 9 wherein said base structure has at least two of said one or more side walls.

19. A pest trap comprising:

a cover; and, a base structure comprising an elevated planar surface, a downward sloping surface sloping down from said planar surface and surrounding at least pant of said planar surface, at least one internal recess centrally formed in said planar surface and at least one substantially semi-circular side recess formed adjacent thereto at a periphery of said planar surface for retaining a sufficient amount of liquid for luring and drowning pests, one or more side walls extending directly upward from said planar surface for supporting said cover above and spaced from said planar surface, said side walls being spaced and separated one from the other to partially enclose said planar surface and one or more of said side recesses while defining an entry space thereabout, at least one said side wall being joined to at least partially surround and laterally enclose one said side recess, and an inclined containment surface surrounding each recess and sloped in the direction of the recess to permit pests to enter said recess but prohibit pests from exiting said recess.

20. The pest trap as in claim 19 wherein said sloping surface sloping down from said planar surface surrounds all of said planar surface.

21. The pest trap as in claim 19 wherein said internal and side recess comprise a combination of circular and semi-circular recesses.

* * * * *